United States Patent [19]
Alford et al.

[11] 3,783,747
[45] Jan. 8, 1974

[54] OIL-CONTROLLED PISTON, AND OIL CONTROL MEANS

[75] Inventors: Raymond N. Alford, Coopers Plains; Hugh A. Race, Big Flats, both of N.Y.

[73] Assignee: Ingersoll-Rand Company, Woodcliff Lake, N.J.

[22] Filed: Sept. 8, 1972

[21] Appl. No.: 287,541

[52] U.S. Cl. ............................................... 92/160
[51] Int. Cl. ............................................ F16j 1/08
[58] Field of Search ............... 92/157, 158, 159, 92/160

[56] References Cited
UNITED STATES PATENTS

| 1,014,052 | 1/1912 | Dock | 92/159 X |
| 1,465,647 | 8/1923 | Ludlam | 92/160 |
| 1,885,681 | 11/1932 | Buren | 92/160 |
| 1,953,109 | 4/1934 | Heron | 92/160 X |
| 2,108,194 | 2/1938 | Church | 92/160 |
| 2,386,117 | 10/1945 | Huid | 92/157 X |
| 2,398,577 | 4/1946 | Bratzel | 92/160 |

FOREIGN PATENTS OR APPLICATIONS

| 724,447 | 2/1955 | Great Britain | 92/157 |

*Primary Examiner*—Irwin C. Cohen
*Attorney*—Bernard J. Murphy

[57] ABSTRACT

The oil control means, in one embodiment thereof, comprises an elongated conduit formed of a spring pin for insertion into drain holes of a piston to restrict admittance of oil into the drain holes from within the piston. The oil-controlled piston comprises a typical gas-engine-type piston having at least one oil-control-ring drain hole formed therein in which drain hole the aforementioned oil control means has been inserted (for instance, by way of retrofitting).

5 Claims, 6 Drawing Figures

PATENTED JAN 8 1974 3,783,747
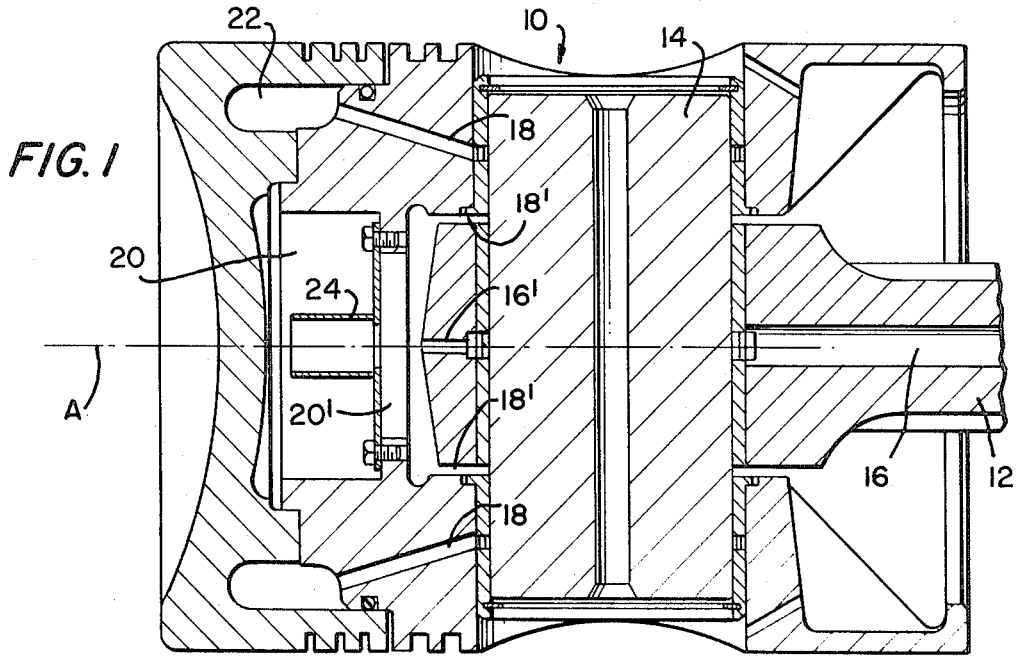
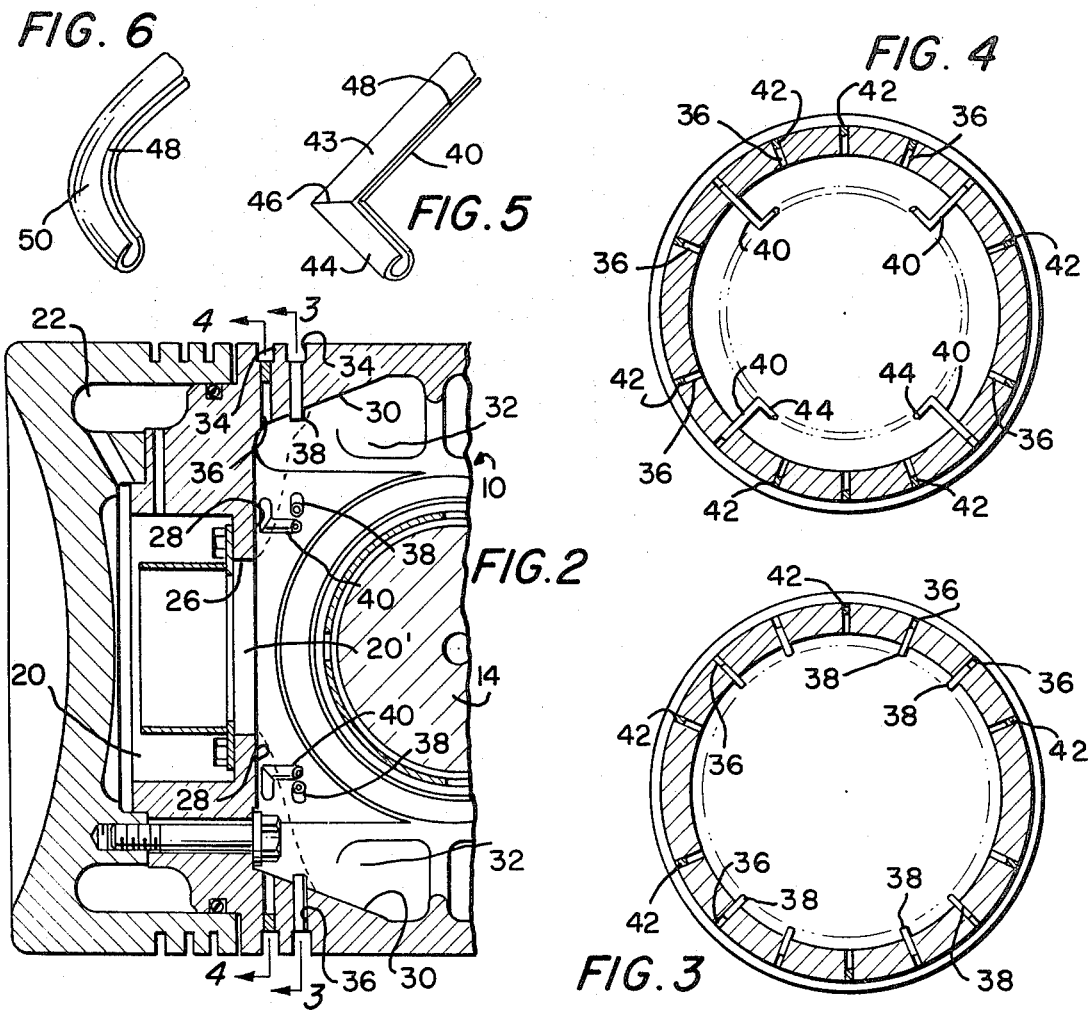

OIL-CONTROLLED PISTON, AND OIL CONTROL MEANS

This invention pertains to means for controlling or metering the consumption of oil in a machine having a reciprocating piston and in particular to means for controlling a conduct of oil through piston drain holes, and to a piston having such oil-controlling means.

In the prior art, means for controlling oil consumption in a piston, and specifically means for controlling the amount of oil admitted to and/or conducted through oil-control drain holes are well known. However, the known means or arrangements for such oil control usually involve little more than oil-control rings, or the like.

It is the object of this invention to set forth a piston, for use in a reciprocating-piston machine, comprising a piston body; said body having oil ring drain holes means formed therein; said piston having a reciprocating axis; said body further having passageway means formed therewithin for admitting lubricant therethrough, substantially along said axis from an area at one axial end of said piston toward an opposite axial end thereof; said passageway means having first means defining an oil impingement deck intermediate said one and opposite axial ends, and second means cooperative with said first means to define therewith an oil receiving reservoir; said drain hole means comprises at least one drain hole which opens at one end thereof on said reservoir, for draining oil from said one drain hole into said reservoir; and selectively replaceable and stationary means carried by said piston for restricting oil admittance into said one end of said drain hole.

It is another object of this invention to set forth conduit means, for insertion into a piston oil-ring drain hole to restrict oil admittance into said drain hole, comprising: a conduit; said conduit having first and second passageways formed therewithin for the conduct of oil therethrough, and passageway juncture means formed therein intermediate opposite ends thereof; said juncture means causing said passageways to extend in transverse planes relative to each other; and wherein at least one end of said conduit is resiliently and deformably responsive to pressure applied thereto to reduce its cross-sectional dimension to admit of insertion of at least a portion of said conduit into a piston oil ring drain hole.

A feature of this invention comprises the use of spring pin in piston oil drain holes to inhibit the quantity of oil passing through the drain holes from within the piston when the piston retracts and inertia causes oil to surge in the direction of the drain holes.

Further objects and features of this invention will become more apparent by reference to the following description taken in conjunction with the accompanying figures, in which:

FIG. 1 is an axial, cross-sectional view of the novel piston, according to an embodiment of the invention:

FIG. 2 is a fragmentary, axial, cross-sectional view, rotated 90° from the view of FIG. 1 of the same piston, of FIG. 1.

FIGS. 3 and 4 are transverse cross-sectional views of the novel piston showing the disclosed oil control means inserted therein, the same being taken along sections 3—3 and 4—4 of FIG. 1; and FIGS. 5 and 6 are illustrations, in enlargement, of embodiments of the novel oil control means, the embodiments shown comprising spring pin.

As shown in The Figures the piston 10 and the connecting rod 12 are joined by a connecting rod pin 14. The rod 12 has oil passages 16 and 16' formed therethrough for communication with oil passageways 18 formed in the piston and a clearance 18' defined between rod 12 and piston 10, and cooling chambers 20 20' and 22 formed in the piston head. As is conventional in piston design, oil is conducted through the passages in a direction substantially corresponding with the piston reciprocating axis "A", for lubrication of pin 14 and the cooling of the piston head.

As the piston 10 changes its direction of movement during its reciprocation within a cylinder, a flood of oil is caused to move into chamber 20 (unless chamber 20 is already filled to an overflow condition) via an oil passageway pipe 24 to supply oil to chamber 22. Within the head of piston 10 there is defined an annular shoulder 26 which presents a deck 28 about which is formed an annular wall 30. The deck 28 and wall 30 cooperate to define an oil trough or reservoir 32 within which, upon reciprocation of the piston, oil is temporarily confined. Conventional oil-control-ring grooves 34 communicate with oil ring drain holes so that oil can pass through the holes 36 to accommodate drainage thereof therethrough, for return through the area of the reservoir 32 and for drainage therefrom to the crankcase.

This arrangement described thus far is standard in piston structure, but is has the disadvantage that oil which is temporarily confined within the reservoir 32 defined by the deck 28 and the wall 30 rushes through the inner terminations of the drain holes 36 and causes a flooding of the piston rings and the cylinder walls. Accordingly, oil consumption becomes excessive.

According to the invention, we teach the use of straight spring pins 38 in the lowermost row of oil ring drain hole 36 and elbow spring pins 40 in the uppermost row of drain holes. All spring pins 40 have the elbow thereof so arranged that the inner end of the spring pin is directed generally downwards towards the skirt of the piston 10. With this improvement, when the piston reciprocatingly retracts, and defines a wave of oil (approximately where and as depicted in dashed outline) within the reservoir 32, spring pins 40, extending from wall 30, and opening substantially below the confined oil, inhibit an admittance of oil to the uppermost row of drain holes 36. The lowermost row of drain holes is generally within the plane of the inertial-formed level of wave of such reservoir confined oil. Now then, in that the wall 30 is set at an angle, it presents larger apertures in the inner ends of holes 36, through which oil can be thrown inertially, or into which oil can pass as it accelerates upwardly on wall 30. For this reason, the straight spring pins 38 present a more difficult target for oil to find for passage into the drain holes in this level.

Spring pins 40 restrict oil admittance into the holes 36, which are radially and circumferentially spaced about the plane defined by section 4—4 of FIG. 2, to an area defined by the plane of section 3—3 of FIG. 2, and to a location generally circumscribed by the parallel, dashed lines in FIG. 4, the latter being spaced apart from the wall 30.

Spring pins 38 restrict oil admittance to the plane in which they are located, i.e., that defined by section 4—4 of FIG. 2, and to an annular area, within the through-flow oil passageway of piston 10, generally indicated by the dashed line in FIG. 3, the latter also being spaced apart from the wall 30.

As FIGS. 2, 3, and 4 indicate, perhaps not all holes 36, will have spring pins set thereinto. Optionally, toward optimum oil control, some of the holes 36 may have plugs 42 in closure thereof.

Spring pins are used as the oil control means because of the facility with which they can be installed in and removed from the drain holes 36. As depicted in FIG. 5, spring pins 40 comprise a pair of straight spring pins 43 and 44 which have been cut on a forty-five degree angle and joined at junction 46, by welding or other means, to define an elbow thereat. The slot 48 allows the insertion end of the spring pin 40 to be compressed, and reduced in diameter, for a slip fit into a hole 36. When released, the spring pin expands and is resiliently restrained in place, and remains stationary therein. Yet, the spring pin 40 (or 38) is readily replaceable from the hole 36 by simply compressing same, to close the slot 48, and withdrawing it.

Other means of forming an elbow are possible, and are comprised by our teaching. Thus, if practicable for the application, a tube, or a spring pin 50 as shown in FIG. 6, can be bent to create the elbow bend or arcuate turn desired.

While we have described the invention in connection with specific embodiments thereof it is to be clearly understood that this is done only by way of example and not as a limitation to the scope of the invention as set forth in the objects thereof and in the appended claims.

We claim:

1. A piston, for use in a reciprocating piston machine, comprising:

a hollow piston body;

said body having an inner, annular wall with oil ring drain hole means formed through said wall;

said piston having a reciprocating axis;

said body further having passageway means formed therewithin for admitting oil therethrough, substantially along said axis, from an area at one axial end of said piston toward an opposite axial end thereof;

said body further having means defining an oil impingement deck intermediate said one and opposite axial ends, said deck being cooperative with said wall to define therewith a trough or reservoir in which, with piston reciprocation, oil admitted via said passageway means becomes temporarily received;

said drain hole means comprises at least one plurality of drain holes which open at one end thereof on said trough or reservoir; and independently resiliently held and selectively replaceable spring pin means carried at solely one end thereof by said drain holes for restricting oil admittance into said one end of each drain hole to an area within said trough or reservoir which is spaced-apart from both said deck and said wall, each said spring pin means comprising a resilient hollow tube having a single continuous slot along its entire length.

2. A piston, according to claim 1, wherein:
said annular wall is concentric with said axis.

3. A piston, according to claim 1, wherein:
said at least one plurality of drain holes comprises at least one row of holes formed through said wall, in radial and circumferentially-spaced disposition relative to said axis; and said one row of holes is disposed in a given plane which is perpendicular to said axis and parallel with and in close proximity to said deck.

4. A piston, according to claim 3, further including:
a second plurality of drain holes comprising a second row of holes formed through said wall, in radial and circumferentially-spaced disposition relative to said axis; wherein said second row of holes is disposed in a plane parallel with, and spacially removed from said given plane; and selectively replaceable spring pin means is carried at solely one end thereof by said drain holes of said second plurality for restricting oil admittance into inner ends of said latter holes to said area, each said spring pin means comprising a resilient hollow tube having a single continuous slot along its entire length.

5. A piston, according to claim 4, wherein:
at least one of all of said spring pins is straight.

* * * * *